A. E. Morgan,
Gate Latch,
Nº 17,908.
Patented July 28, 1857.
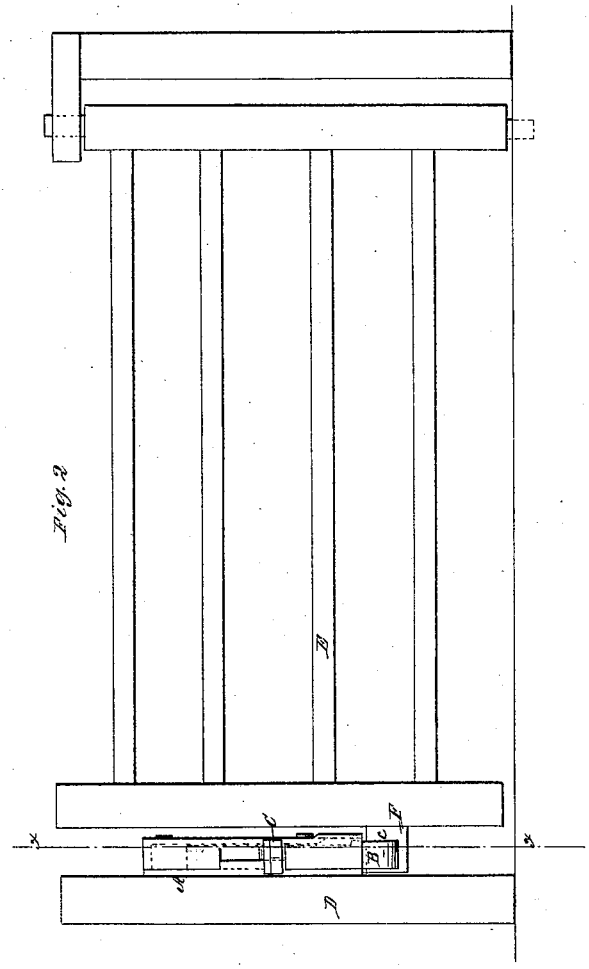
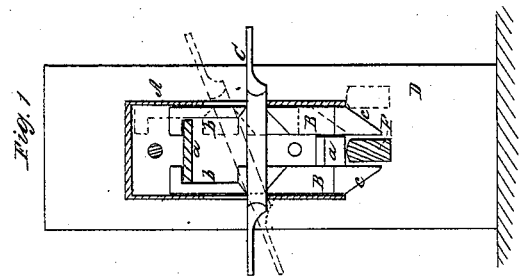

UNITED STATES PATENT OFFICE.

A. E. MORGAN, OF POUGHKEEPSIE, NEW YORK, ASSIGNOR TO HIMSELF, D. TODD, AND JNO. B. WEDDLE.

GATE-LATCH.

Specification of Letters Patent No. 17,908, dated July 28, 1857.

*To all whom it may concern:*

Be it known that I, ALFRED E. MORGAN, of Poughkeepsie, in the county of Dutchess and State of New York, have invented a new and Improved Gate Catch or Latch; and I do hereby declare that the following is a full, clear, and exact description of the same, reference being had to the accompanying drawing, making a part of this specification, in which—

Figure 1 is a vertical section of my improvement, (*x*) (*x*) in Fig. 2 indicating the plane of section. Fig. 2 is a side view of the same applied to the gate or rather to the gate post.

Similar letters of reference indicate the same parts in both figures.

This invention consists in the arrangement and combination, in a suitable case, of a pair of vertically moving locking-bolts with a horizontal thumb bar, in the manner and for the purposes hereinafter described.

To enable those skilled in the art to fully understand and construct my invention, I will proceed to describe it.

A, represents a rectangular case, which may be constructed of cast iron; and B, B, represent two bars or bolts which are fitted vertically within the case A, the bars being allowed to work freely up and down therein. These bars or bolts are fitted and work between the sides of the case A, and guides or "stumps" (*a*) (*a*), the upper ends of the bars or bolts B, having recesses (*b*) formed in them, one in each, which recesses determine the length of play or movement of the bars or bolts on account of the ends of the upper stump or guide (*a*) being within said recesses, as shown clearly in Fig. 1.

C, represents a thumb-bar which passes transversely through the case A, and which is fitted in notches made in the inner sides of the bars or bolts. By means of this bar C, either of the bars or bolts B, may be raised by operating said bar with the thumb or finger.

The lower ends of the bars or bolts B are beveled at their outer sides, as shown at (*c*) in Fig. 1.

The case A, is attached to the post D of the gate E, and a bar F, is attached to the gate, said bar being in line with the lower ends of the bars or bolts B, B.

From the above description of parts it will be seen that when the gate E is open and swung toward its post D, the bar F on the gate will raise the nearest bolt or bar B, and will strike against the other. The bolt or bar which was raised by the bar F, falling by its own gravity as soon as the bar F has passed it. The bar F will consequently be retained between the bolts or bars B, and the gate E secured in a closed state.

By employing the two bolts or bars B, the bar F, is sure to be arrested, however violently the gate may be swung toward its post and will be prevented from swinging past it.

I am aware that in Loudon's *Encyclopedia of Agriculture*, (page 502) there is described a gate-fastener composed of two separate swinging bolts. I do not claim, broadly, to be the first inventor of vertically-moving bolts or latches. I particularly disclaim the latch now in use on the southwest gate of Lafayette Square, Washington, D. C. In neither of the examples cited is there seen the combination of a pair of vertically-moving locking-bolts with a thumb bar as herein described. In both of the said examples the locking bolts are exposed to the weather, and in this climate, are liable to become inoperative in winter by reason of the formation of ice. But in my improvement, the operating parts are entirely protected from the weather, and no such difficulty can arise.

What I claim as my invention, and desire to secure by Letters Patent, is:—

The arrangement and combination together, within a suitable case A, of a pair of vertically-moving locking-bolts or bars (*b*, *b*,) with a horizontal thumb bar C, as and for the purposes described.

ALFRED E. MORGAN.

Witnesses:
A. M. BRUSH,
JEREMIAH BANKER.